US012774895B2

(12) United States Patent
Dai et al.

(10) Patent No.: US 12,774,895 B2
(45) Date of Patent: Oct. 27, 2026

(54) COMPUTER-IMPLEMENTED APPARATUS AND METHOD FOR PREDICTING TRAFFIC CONDITIONS IN A ROUTE PLANNING APPLICATION

(71) Applicant: GRABTAXI HOLDINGS PTE. LTD., Singapore (SG)

(72) Inventors: Chengcheng Dai, Singapore (SG); Padarn George Wilson, Singapore (SG); Guanfeng Wang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 358 days.

(21) Appl. No.: 18/561,442

(22) PCT Filed: Jun. 29, 2022

(86) PCT No.: PCT/SG2022/050450
§ 371 (c)(1),
(2) Date: Nov. 16, 2023

(87) PCT Pub. No.: WO2023/277814
PCT Pub. Date: Jan. 5, 2023

(65) Prior Publication Data

US 2024/0369370 A1 Nov. 7, 2024

(30) Foreign Application Priority Data

Jun. 30, 2021 (WO) ................ PCT/CN2021/103471

(51) Int. Cl.
*G01C 21/34* (2006.01)
*G01C 21/36* (2006.01)

(52) U.S. Cl.
CPC ..... *G01C 21/3492* (2013.01); *G01C 21/3626* (2013.01); *G01C 21/3691* (2013.01)

(58) Field of Classification Search
CPC ............ G01C 21/3492; G01C 21/3626; G01C 21/3691; G08G 1/0141; G08G 1/0129
(Continued)

(56) References Cited

U.S. PATENT DOCUMENTS 7,813,870 B2 10/2010 Downs et al.
7,953,544 B2 5/2011 Amemiya et al.
(Continued)

FOREIGN PATENT DOCUMENTS

CN 110415521 A 11/2019
CN 111862591 A 10/2020

OTHER PUBLICATIONS

International Search Report and Written Opinion dated Jan. 17, 2023 which was recieved in connection with PCT/SG2022/050450.
(Continued)

*Primary Examiner* — Hitesh Patel
*Assistant Examiner* — John D Holman
(74) *Attorney, Agent, or Firm* — Buckley, Maschoff & Talwalkar LLC

(57) ABSTRACT

A computer-implemented apparatus, and associated method, for predicting traffic conditions in respect of a specified route selected from within a road network representative of a geographical region. The computer-implemented apparatus comprises a processor and memory and is configured, under control of the processor, to execute instructions stored in the memory to: receive input data representative of said specified route comprising one or more road segments between a start location and a destination selected from within a road network representing a geographical region; obtain a diffusion graph representative of said specified route, said diffusion graph comprising edges connected by nodes, wherein a weight associated with each edge comprises a respective transition probability representing a likelihood of traffic on a respective road segment diffusing to another road segment; and use a Transformer-based framework to predict a traffic condition for each segment of the route; wherein said Transformer-based framework comprises an attention module and an input configured to receive a set of input dimensions for each segment of the route, said dimensions including at least a respective transition probability and temporal data, said Transformer-based framework further comprising an attention adjust module configured to receive each set of input dimensions and generate therefrom a weight modifier for modifying attention weights generated by said attention module based on the likelihood of a traffic
(Continued)

state on one road segment influencing a traffic state on another road segment.

22 Claims, 7 Drawing Sheets

(58) Field of Classification Search
USPC .......................................................... 701/423
See application file for complete search history.

(56) References Cited

U.S. PATENT DOCUMENTS

| | | | | |
|---|---|---|---|---|
| 9,037,519 | B2 | 5/2015 | Han et al. | |
| 2019/0204100 | A1* | 7/2019 | Sharma | G08G 1/012 |
| 2021/0247201 | A1* | 8/2021 | Hori | G01C 21/3673 |
| 2022/0277329 | A1* | 9/2022 | Li | G06N 3/08 |
| 2023/0058520 | A1* | 2/2023 | Jiang | G08G 1/0129 |

OTHER PUBLICATIONS

Xu M. et al., Spatial-Temporal Transformer Networks for Traffic Flow Forecasting. arXiv, Mar. 29, 2021 [Retrieved on Jan. 10, 2023] <DOI: 10.48550/arXiv.2001.02908> Entire Document.

Park C. et al., ST-GRAT: A Novel Spatio-temporal Graph Attention Network for Accurately Forecasting Dynamically Changing Road Speed. arXiv, Oct. 20, 2020 (Retrieved on Jan. 10, 2023) <DOI: 10.48550/arXiv.1911.13181 > Entire Document.

Li Y. et al., Forecaster: A Graph Transformer for Forecasting Spatial and Time-Dependent Data. arXiv, Feb. 21, 2020 [Retrieved on Jan. 10, 2023] <DOI: 10.48550/arXiv.1909.04019> Entire Document.

Qi et al.,: "A Hidden Markov Model for short term prediction of traffic conditions on freeways", Elsevier, Transportation Research Part C, Oct. 11, 2013.

* cited by examiner

COMPUTER-IMPLEMENTED APPARATUS AND METHOD FOR PREDICTING TRAFFIC CONDITIONS IN A ROUTE PLANNING APPLICATION

This application is a U.S. National Stage filing under 35 USC § 371 claiming benefit of and priority to International Application No. PCT/SG2022/050450, filed on Jun. 29, 2022, and claiming benefit of and priority to PCT Application No. PCT/CN2021/103471 filed on Jun. 30, 2021, each of which are hereby incorporated by reference herein in their entirety.

TECHNICAL FIELD

The invention relates generally to the field of transport metrics and data. One aspect of the invention relates to a computer-implemented apparatus for predicting traffic conditions in respect of a specified route in conjunction with, for example, a route planning application. Another aspect of the invention relates to a communications server apparatus including a computer-implemented apparatus for predicting traffic conditions in respect of a specified route. Another aspect of the invention relates to a service provider communications device including a routing API and a computer-implemented apparatus for predicting traffic conditions in respect of a route specified by the routing API. Another aspect of the invention comprises a communications system comprising a service provider communications device, a user communications device and a communications server apparatus, all communicably connected through a communications network, the communications server apparatus including a computer-implemented apparatus for predicting traffic conditions in respect of a specified route. Another aspect of the invention relates to a method, performed in a computer-implemented apparatus, for predicting traffic conditions in respect of a specified route in, for example, a route planning application. Another aspect of the invention relates to a computer program product comprising instructions therefor. Another aspect of the invention relates to a computer program comprising instructions therefor. Another aspect of the invention relates to a non-transitory storage medium storing instructions therefor. Another aspect of the invention relates to a communications system including a communications server apparatus including a route planning application and module for predicting traffic conditions in association therewith.

One aspect of the invention has particular, but not necessarily exclusive, application in a shared economy, on-demand transport or delivery service provision.

BACKGROUND

In a communications system for implementing and managing a shared economy on-demand transport and/or delivery service provision, a customer will typically generate a service request for a transport or delivery service, via a user communications device, indicating a time (and date, if applicable) at which the service is required, a pick-up point, a destination and the number of people (or type of delivery item) required to be transported (plus any other information relevant to determining the type of vehicle required to fulfil the service request).

The service request is received by a communications server apparatus and then allocated to an available service provider, via a service provider communications device. The communications server might typically include a route planning API that receives location data from the allocated service provider communications device indicative of the current location of the allocated service provider, as well as the pick-up point and drop-off location from the service request, and calculates an appropriate route (e.g. shortest route) in a known manner. Once the route is known, it is highly desirable to also know the likely traffic conditions along the specified route such that, for example, a travel time and/or appropriate fare can be calculated, an estimated pick-up time can be calculated, and a drop-off time can be estimated (so that it can be estimated when the allocated service provider is likely to be available once again to fulfil future service requests). Currently, allocating resources to on-demand services, such as transport and/or delivery, is based typically on driver availability and estimated travel times to the pick-up point and then to the drop-off location. These signals enable available service providers to be assigned to service requests as they are received, based on available service providers within the correct geographical region. For example, some systems, when a service request is received, may simply allocate the nearest available service provider. The allocated service provider is then flagged as 'busy' (and, therefore, not available for allocation to any other service requests) until the current service has been completed. The service provider may then be allocated to another service request if or when they are deemed the nearest available service provider to the pick-up point associated therewith. Of course, this can and does lead to service provider idle times, which represents an inefficient use of available resources. In addition, especially during busy periods when large numbers of service requests are being received, since service providers are not able to be allocated to a service request until their last job is completed, there can be a severe shortage of available service providers in relation to the number of unmet service requests, leading to delays. This extreme supply-demand imbalance can quickly lead to a saturation point, where the backlog of service requests in relation to available service providers means that no more service requests can be served in an acceptable time frame. Of course, such a mismatch in the supply-demand distributions is not limited to transport/delivery (or other on-demand, shared economy) services, but can be equally applicable to other shared economy services, such as Cloud computing and peer-to-peer electricity trading, for example.

Attempts have been made to address this supply-demand imbalance by allocating future service requests to service providers whilst they are still 'busy' fulfilling the last service request. However, in order to do this with any degree of accuracy, it is essential that (at least) the drop-off time for that last service request can be accurately estimated. It is also highly desirable to be able to accurately estimate the pick-up time for the next service request, as well as travel time (so that an appropriate fare can be estimated), in order to ensure customer satisfaction. This, in turn, requires an accurate prediction of traffic conditions along the specified route.

Traffic forecasting is emerging as a core component of intelligent transportation systems. However, real-time traffic forecasting has remained a technical challenge due to the highly nonlinear and dynamic spatial-temporal dependencies of traffic flows. With the widespread deployment of affordable traffic sensor technologies in recent, systems have been developed for predicting future traffic conditions based on historical traffic conditions, for example. However, and in general, the accuracy of such systems tends to be limited due to the use of fixed assumptions which fail to adequately take into account the highly dynamic nature of traffic flows, nor do they capture the spatio-temporal conditions in traffic flows.

Mingxing Xu, et al., "Spatial-Temporal Transformer Networks for Traffic Flow Forecasting" (January 2020) describes a theoretical method for modelling and forecasting long-term traffic flows that attempts to capture these spatio-temporal correlations to improve the accuracy of traffic condition predictions on a road network, and purports to offer fast and scalable training and accurate long-term traffic forecasting for an entire road network based in historical traffic sensor data. This method, amongst others, utilises a Transformer framework to implement sequential data processing. The described Transformer framework is built on a so-called attention mechanism to model sequential data which makes the model faster, both in training and inference. This is particularly important for real-time applications. However, the Transformer-based approaches proposed in the prior art, cannot accurately predict traffic conditions along a selected route. Whilst it is, of course, possible to 'crop' the road network model to highlight a certain route and determine the traffic conditions in relation to that route from the model, these traffic conditions cannot be sufficiently segmented or accurate to provide anything more than a general 'snapshot' of an expected (long-term) traffic condition pattern generated for that route within the entire road network model. This is because there are context-based variables associated with a selected route generated in respect of a service request as described above that simply cannot be taken into account.

Transformer-based frameworks have key advantages in solving prediction problems in many different fields compared with solutions using Convolutional Neural Networks (CNNs) or Recurrent Neural Networks (RNNs), for example, in terms of both speed and processing overhead, because they are built solely on attention mechanisms which makes the resultant model faster, both in training and inference. However, known Transformer-based architectures cannot readily be applied to the problem of context-based traffic state classification because they are designed for the sequential dependency between source and target sequences, and cannot be naturally or routinely modified to incorporate context-related variables, such as real-time speed, vehicle type, the manner in which traffic diffuses (in real time) between road segments, as well as time of day and day of week. In the prior art referenced above, it is proposed to address the issue of spatio-temporal dependencies using multiple models and/or multiple attention heads in a transformer-based framework in order to take into account some spatio-temporal variables. However, this requires significant additional layer of computational overhead which makes it inappropriate for a fast-moving real-time route-based traffic condition prediction system as might be required for resource allocation in a shared economy on-demand transport and/or delivery service provision.

In real-time, fast moving applications, such as a shared economy on-demand transport and/or delivery service, where very accurate real-time prediction of traffic conditions along a route is of paramount importance to resource allocation, Transformer-based frameworks proposed in the prior art have not performed adequately, whereas solutions using CNNs or RNNs, for example, may be more accurate but the additional computational overhead and resultant latency makes these solutions inappropriate for real-time fast moving applications such as those described above. There remains an ongoing need to provide a route-based traffic state prediction method and system that provide consistent, accurate and real-time context-based traffic state predictions in respect of a pre-specified route, and aspects of the present invention seek to address one or more of these issues.

SUMMARY

Aspects of the invention are as set out in the independent claims. Some optional features are set out in the dependent claims.

A first exemplary arrangement provides a computer-implemented apparatus for predicting traffic conditions in respect of a specified route within a road network, the apparatus comprising a processor and a memory, and being configured, under control of the processor, to execute instructions stored in the memory to:

- receive input data representative of said specified route comprising one or more road segments between a start location and a destination selected from within a road network representing a geographical region;
- obtain a diffusion graph representative of said specified route, said diffusion graph comprising edges connected by nodes, wherein a weight associated with each edge comprises a respective transition probability representing a likelihood of traffic on a respective road segment diffusing to another road segment; and
- use a Transformer-based framework to predict a traffic condition for each segment of the route;

wherein said Transformer-based framework comprises an attention module and an input configured to receive a set of input dimensions for each segment of the route, said dimensions including at least a respective transition probability and temporal data, said Transformer-based framework further comprising an attention adjust module configured to receive each set of input dimensions and generate therefrom a weight modifier for modifying attention weights generated by said attention module based on the likelihood of a traffic state on one road segment influencing a traffic state on another road segment.

The nodes of the diffusion graph may represent road segments (which may correspond to edges in a road network graph from which the diffusion graph is obtained). The respective transition probability input to the network for a given route segment may comprise (or be based on) a transition probability associated with the road segment in the diffusion graph, optionally corresponding to the transition probability from the given route segment to a next route segment, or from a preceding route segment to the given route segment.

Each said set of input dimensions may include temporal data in the form of a day of the week and/or a time period (e.g. time of day) represented by respective numerical values. Alternatively or additionally, each said set of input dimensions may include numerical data representative of a road type and/or a vehicle type in relation to travel along said specified route. Alternatively or additionally, each said set of input dimensions may include data representative of a speed of travel on a road segment (e.g. represented by a respective edge in a road network graph or node in the diffusion graph) and/or a length of a road segment (e.g. represented by a respective edge in a road network graph or node in the diffusion graph).

Said data representative of a speed of travel and/or said data representative of a length of a road segment may be normalized in each said set of input dimensions.

The apparatus may be configured to receive said specified route from a routing API.

Preferably, the apparatus is further configured to calculate a travel time in respect of said specified route based on the predicted traffic conditions. The apparatus may be configured to output the predicted traffic conditions in relation to said specified route on a display.

In an embodiment, the apparatus is configured to obtain an edge-based graph representative of said specified route in which each vertex (node) represents a segment of the road network, and a vertex (node) is connected to an adjacent vertex (node) if it is possible to reach one respective road segment from the other, and to determine the diffusion graph using the edge-based graph. The apparatus may be configured to determine respective transition probabilities in the diffusion graph based on corresponding weights in the edge-base graph.

The apparatus may be configured to generate the weight modifier for modifying attention weights based on distances between road segments.

A further exemplary arrangement provides a communications apparatus for allocating resources to service requests related to a shared economy on-demand travel and/or transport service provision, the communications apparatus comprising a processor, a memory and a computer-implemented apparatus as set out in the first exemplary arrangement above for predicting traffic conditions, and being configured, under control of the processor, to:

receive a service request;

identify a start location and a destination specified in said service request;

obtain a recommended route comprising one or more road segments between said start location and said destination selected from within a road network representing a geographical region;

identify a service provider for fulfilling said service request; and input said recommended route and optionally data representative of said service provider to said apparatus for predicting traffic conditions to generate a set of predicted traffic condition data associated with said one or more road segments in said recommended route.

The apparatus may be configured to output said predicted traffic condition data in association with said recommended route on a user display.

Preferably, the apparatus is further configured to predict an arrival time of said service provider at said destination using the predicted traffic condition data, and optionally to allocate another service request to said service provider based on said predicted arrival time at said destination of the previous service request.

The apparatus may comprise a data store in which is stored edge-based graph data for said road network, and wherein said apparatus for predicting traffic conditions is further configured to selectively retrieve said edge-based graph data representative of a recommended route from said data store. Said data store may be a distributed data store comprising a plurality of memory locations, each memory location storing edge-based graph data for a different respective portion of said road network.

A further exemplary arrangement provides a communications system for allocating resources to service requests related to a shared economy on-demand transport and/or delivery service provision, the communications system comprising at least one user communications device and communications network equipment operable for the communications server apparatus and the at least one user communications device to establish communication with each other therethrough, and at least one service provider communications device and communications network equipment operable for the communications server apparatus and the at least one service provider communications device to establish communication with each other therethrough, the communications server apparatus comprising a processor, a memory and a computer-implemented apparatus as set out in the first exemplary arrangement above, and being configured, under the control of the processor, to execute instructions stored in the memory to:

receive a service request from the user communications device;

input a start location and a destination specified in said service request to a routing API to obtain a recommended route comprising one or more road segments between said start location and said destination selected from within a road network representing a geographical region;

identify a service provider for fulfilling said service request; and input said recommended route and optionally data representative of said service provider to said apparatus for predicting traffic conditions to generate a set of predicted traffic condition data associated with said one or more road segments in said recommended route.

A further exemplary arrangement provides a service provider communications device for receiving data representative of service requests allocated to a service provider from a communications server apparatus via a communications network, the service provider communications device comprising a routing API, and a computer-implemented apparatus as set out in the first exemplary arrangement above, a processor and a memory, and being configured, under control of the processor, to execute instructions stored in the memory to:

receive data representative of a service request including a start location and a destination;

input said start location and destination specified in said service request to said routing API to obtain a recommended route comprising one or more road segments between said start location and said destination selected from within a road network representing a geographical region; and input said recommended route and optionally data representative of said service provider to said apparatus for predicting traffic conditions to generate a set of predicted traffic condition data associated with said one or more road segments in said recommended route.

A further exemplary arrangement provides a computer-implemented method of predicting traffic conditions in respect of a specified route within a road network, comprising the steps of:

receiving input data representative of said specified route comprising one or more road segments between a start location and a destination selected from within a road network representing a geographical region;

obtaining a diffusion graph representative of said specified route, said diffusion graph comprising edges connected by nodes, wherein a weight associated with each edge comprises a respective transition probability representing a likelihood of traffic on a respective road segment diffusing to another road segment; and using a Transformer-based framework to predict a traffic condition for each segment of the route;

wherein said Transformer-based framework comprises an attention module and an input configured to receive a set of input dimensions for each segment of the route, said dimensions including at least a respective transition probability and temporal data, said Transformer-based framework further comprising an attention adjust module configured to receive each set of input dimensions and generate therefrom a weight modifier for modifying attention weights generated by said attention module based on the likelihood of a traffic state on one road segment influencing a traffic state on another road segment.

The invention also provides a computer program, computer program product or non-transitory storage medium comprising or storing instructions for implementing the above method.

Implementation of the techniques disclosed herein may have significant technical advantages. In a system such as a shared economy on-demand transport and/or delivery system, once a service request has been received and a service provider allocated, a route can be automatically determined using a routing API of a type known in the art (e.g. shortest route from service provider location→pick-up point→destination). A transformer-based prediction module models the specified route (in isolation from the rest of the road network) and predicts traffic conditions along segments of the specified route, taking spatial and temporal conditions, and context-based variables, into account The unique transformer-based solution proposed herein offers accurate traffic condition modelling, prediction and reporting in real time and in respect of the specified route (rather than just a section of a broader, more general model), whilst requiring minimal additional memory or processing overhead beyond that required to operate a conventional maps and navigation API. Thus, it can be integrated with such an API running on a communications server apparatus without undue data processing or storage challenges.

The technical challenge of utilizing a Transformer-based framework to make context-based inferences in this manner will be apparent to a person skilled in the art, because it has, until now, been widely understood that transformer-based prediction is limited to sequential dependencies between source and target sequences. Thus, in the field of modelling and inference, a skilled person would not usually consider using a transformer-based solution if context-based (variable) parameters need to be taken into account or, if they did, it would not be expected that multiple different Attention heads and/or different models would need to be incorporated in order to account for all of the different respective context-based variables. This, in turn, would negatively impact the processing/storage overhead, and inevitably increase latency, such that this type of solution might normally be disregarded as unsuitable for fast-moving real-time applications such as shared economy on-demand transport and/or delivery services, wherein up-to-the minute, consistent and highly accurate route-based traffic condition predictions need to be delivered in real time in order to ensure efficient allocation of resources and accurate timing and pricing calculations.

BRIEF DESCRIPTION OF THE DRAWINGS

The invention will now be described by way of example only, and with reference to the accompanying drawings in which.

DETAILED DESCRIPTION

Figure 1:
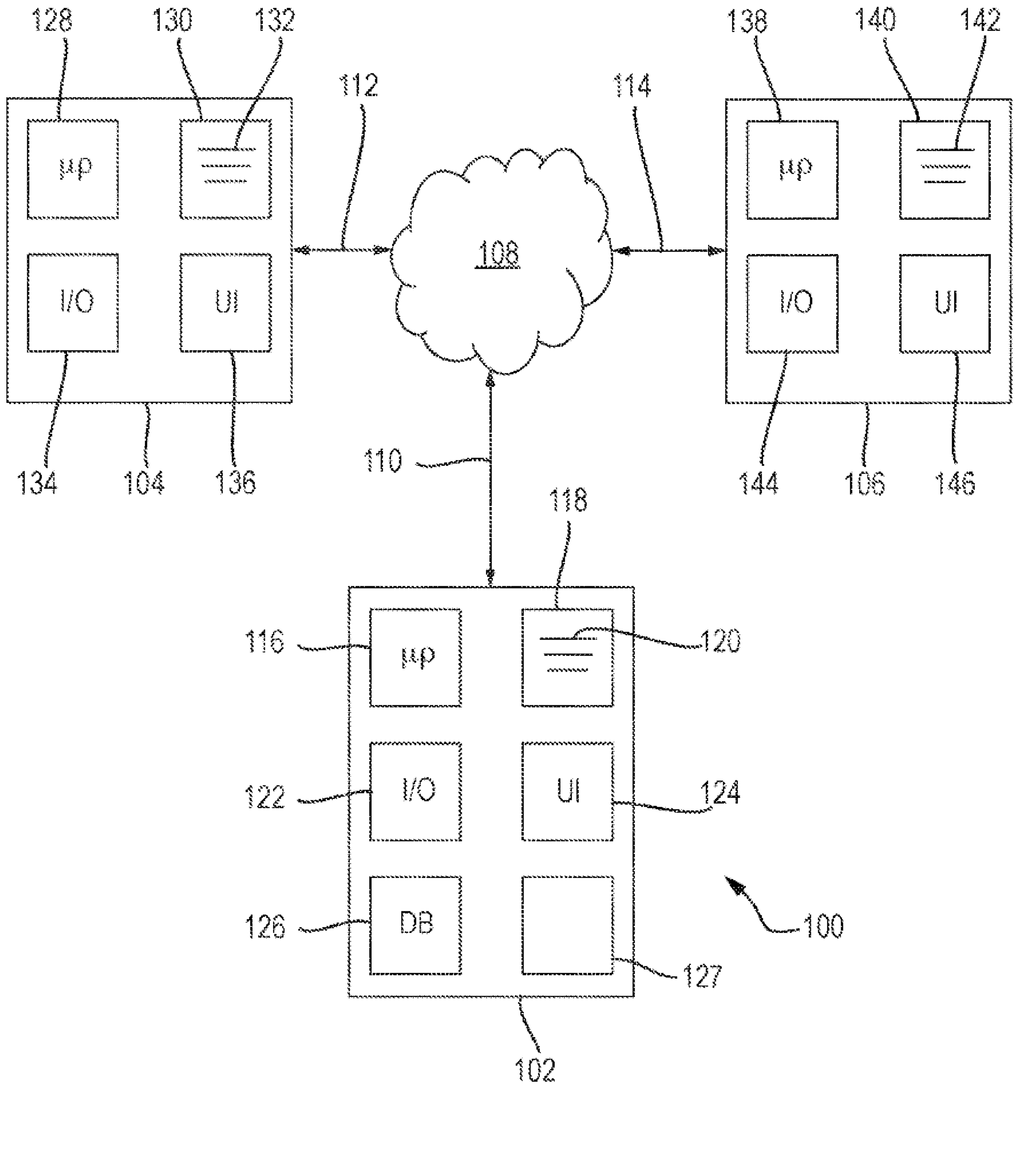
FIG. 1 is a schematic block diagram illustrating an exemplary communications system including a communications server apparatus for allocating resources to service requests related to a shared economy on-demand service.

The techniques described herein are described primarily with reference to use in shared economy on-demand transport and/or delivery services, but it will be appreciated that these techniques may have a broader reach and cover other types of transport services, where highly accurate route-based traffic state predictions are required. Referring first to FIG. 1, a communications system 100 is illustrated. Communications system 100 comprises communications server apparatus 102, user communications device 104 and service provider communications device 106. These devices are connected in the communications network 108 (for example the Internet) through respective communications links 110, 112, 114 implementing, for example, internet communications protocols. Communications devices 104, 106 may be able to communicate through other communications networks, such as public switched telephone networks (PSTN networks), including mobile cellular communications networks, but these are omitted from FIG. 1 for the sake of clarity.

Communications server apparatus 102 may be a single server as illustrated schematically in FIG. 1, or have the functionality performed by the server apparatus 102 distributed across multiple server components. In the example of FIG. 1, communications server apparatus 102 may comprise a number of individual components including, but not limited to, one or more microprocessors 116, a memory 118 (e.g. a volatile memory such as a RAM) for the loading of executable instructions 120, the executable instructions defining the functionality the server apparatus 102 carries out under control of the processor 116. Communications server apparatus 102 also comprises an input/output module 122 allowing the server to communicate over the communications network 108. User interface 124 is provided for user control and may comprise, for example, computing peripheral devices such as display monitors, computer keyboards and the like. Communications server apparatus 102 also comprises a database 126, the purpose of which will become readily apparent from the following discussion. In this embodiment, database 126 is part of the communications server apparatus 102, however, it should be appreciated that database 126 can be separated from communications server apparatus 102 and database 126 may be connected to the communications server apparatus 102 via communications network 108 or via another communications link (not shown). The communications server apparatus may further include a traffic state prediction module 127, which is described in more detail below. In other embodiments, a traffic state prediction module may be incorporated into the service provider communications device 106 escribed below, and the invention is not intended to be limited in this regard.

User communications device 104 may comprise a number of individual components including, but not limited to, one or more microprocessors 128, a memory 130 (e.g. a volatile memory such as a RAM) for the loading of executable instructions 132, the executable instructions defining the functionality the user communications device 104 carries out under control of the processor 128. User communications device 104 also comprises an input/output module 134 allowing the user communications device 104 to communicate over the communications network 108. User interface 136 is provided for user control. If the user communications device 104 is, say, a smart phone or tablet device, the user interface 136 will have a touch panel display as is prevalent in many smart phone and other handheld devices. Alternatively, if the user communications device is, say, a desktop or laptop computer, the user interface may have, for example, computing peripheral devices such as display monitors, computer keyboards and the like.

Service provider communications device 106 may be, for example, a smart phone or tablet device with the same or a similar hardware architecture to that of user communications device 104. Service provider communications device 106 may comprise a number of individual components including, but not limited to, one or more microprocessors 138, a memory 140 (e.g. a volatile memory such as a RAM) for the loading of executable instructions 142, the executable instructions defining the functionality the service provider communications device 106 carries out under control of the processor 138. Service provider communications device 106 also comprises an input/output module (which may be or include a transmitter module/receiver module) 144 allowing the service provider communications device 106 to communicate over the communications network 108. User interface 146 is provided for user control. If the service provider communications device 106 is, say, a smart phone or tablet device, the user interface 146 will have a touch panel display as is prevalent in many smart phone and other handheld devices. Alternatively, if the user communications device is, say, a desktop or laptop computer, the user interface may have, for example, computing peripheral devices such as display monitors, computer keyboards and the like. The service provider communications device 106 may further include a routing API module 147 for receiving data representative a pickup point, pickup time, destination and vehicle type and determining a (shortest) route to be used by the service provider to fulfil a respective service request.

In one embodiment, the service provider communications device 106 is configured to push data representative of the service provider (e.g. service provider identity, location and so on) regularly to the communications server apparatus 102 over communications network 108. In another, the communications server apparatus 102 polls the service provider communications device 106 for information. In either case, the data from the service provider communications device 106 (also referred to herein as 'available data' or 'supply' data) are communicated to the communications server apparatus 102.

In one embodiment, the user communications device 104 is configured to push data representative of the user (e.g. merchant identity, location, food preparation times or required pick-up times, customer details, and so on) regularly to the communications server apparatus 102 over communications network 108. In another, the communications server apparatus 102 polls the service provider communications device 104 for information. In either case, the data from the user communications device 104 (also referred to herein as 'service requests') are communicated to the communications server apparatus 102.

In use, a user may generate a service request via the user communications device 104, which service request includes data representative of (at least) a pickup point, a destination, a time required for pickup, and a number and type of persons, or a type and size of item, to be picked up from the pickup point and delivered to the destination. This latter characteristic determines the type of vehicle required to fulfil the service request. For example, if a number of persons require a taxi, then the type of vehicle required will be a motor vehicle, which can be denoted herein, for example, as '4W' (meaning 'four wheeled vehicle). In other service requests, it may be required to pickup food from a food merchant and deliver it to a customer address. In this case, the vehicle type may be '4W' once again, or the service request may, for example, be fulfilled by a bicycle, which could be denoted herein as '2W'. In an embodiment, the service request can either be allocated to an available service provider via the communications server apparatus 102, and details of the service request pushed to the service provider communications device 106. Thus, the service request data is obtained by the service provider communications device 106 and the pickup time, the pickup location and the destination can be fed to a conventional routing API so that an appropriate route (usually shortest route, although the system is by no means intended to be limited in this regard) can be calculated and defined. This route is then fed to a traffic state prediction module, which may either be hosted by the communications server apparatus, or it may be hosted locally on the service provider communications device. Either way, the traffic state prediction module is configured to determine traffic state conditions (only) for the selected route and return the results to the service provider, as will be described in more detail hereinafter. The traffic condition data may also be reported to the communications server apparatus, such that the time required to fulfil the service request can be accurately estimated, thereby estimating the time at which the service provider will, once again, be available to fulfil a service request. The communications server apparatus 102 can use this data in a planning and allocation module for assigning service requests to available service providers, wherein a future service request can then be allocated to a 'busy' service provider by estimating when they will next be available and without waiting for the service provider to complete the previous service request. Because the traffic conditions for the precise (known) route being used by a service provider for a particular service request are accurately determined, it is not only possible to reduce service provider 'idle' time (as described above), resulting in a significantly more efficient use of available resources, but it is also possible to match future service requests to available service providers based on a time at which they will be at the destination of the previous service request. This means that the service provider could, for example, be allocated a next service request having a pickup location close to the destination of the previous service request and a pickup time very shortly after the estimated time of completing the previous service request, based on the accurate output of the traffic state prediction module described below. During busy periods, when large numbers of service requests are being received, when service providers are not able to be allocated to a service request until their last job is completed, there can be a severe shortage of available service providers in relation to the number of unmet service requests, leading to delays. This extreme supply-demand imbalance can quickly lead to a saturation point, where the backlog of service requests in relation to available service providers means that no more service requests can be served in an acceptable time frame. Of course, such a mismatch in the supply-demand distributions is not limited to transport/delivery (or other on-demand, shared economy) services, but can be equally applicable to other shared economy services, such as Cloud computing and peer-to-peer electricity trading, for example. Implementations of the techniques disclosed herein seek to address at least some of these issues by utilising an accurate traffic state prediction module that takes a selected route expected to be taken by a service provider in respect of a service request, determines the traffic state conditions along each segment of that route, and a) displays these traffic conditions to the service provider, and b) utilises the traffic condition data to accurately determine a time at which the service provider will reach their destination such that a next service request can be allocated to that service provider (while they are still 'busy') that has a pickup time close to the estimated drop-off time of the previous service request and/or a pickup location close to the destination of the previous service request. As a result, the potential mismatch in supply and demand conditions of a shared economy on-demand service can be alleviated.

Thus, in a communications system for implementing and managing a shared economy on-demand transport service provision, a customer will typically generate a service request for a transport and/or delivery system, via the user communications device 104, indicating a time (and date) at which the service is required, a pick-up point, a destination and the number of people (or type of item) required to be transported (plus any other information relevant to determining the type of vehicle required to fulfil the service request.

The service request is received by the communications server apparatus 102 and then allocated to an appropriate service provider via the service provider communications device 106. In an embodiment, the communications server apparatus 102 includes a route planning API that receives location data from the service provider communications device 106 indicative of the current location of the allocated service provider (or their last destination), as well as the pick-up point and destination from the service request, and calculates an appropriate route (e.g. shortest route) in a known manner. Once the route is known (from the service provider current destination to the pick-up point and on to the destination of the current service request), it is highly desirable to also know the likely traffic conditions along the specified route such that, for example, a travel time and/or appropriate fare can be calculated, an estimate pick-up time can be calculated, and an estimated drop-off time can be estimated (so that it can be determined when the allocated service provider is likely to be available again to fulfil future service requests). For this purpose, the above-referenced traffic state prediction module 127 is provided, and will now be described in more detail.

In order to address the problems outlined above using a transformer-based framework, it can be useful to take spatial (network information) and temporal (sequential information) dependencies into consideration, and model the influence of traffic conditions between segments along the route to accurately predict traffic conditions. Specifically, and as described above, for spatial dependencies, this embodiment computes the traffic diffusion graph (FIG. 2) to describe how traffic would diffuse on segments, and then encodes the temporal information into network input dimensions to train the transformer network. For within-route dependencies, the attention score of the self-attention layer is updated according to the similarity between segments along the route, and this similarity is used to describe how likely the current traffic state on an edge will continue on each following edge. In order to achieve this, it can be assumed that a route contains N compressed edges (segments) and, for each compressed edge, there are provided M dimensions to describe the traffic state for each respective compressed edge. In practice, these 'dimensions' may comprise real-time speed, length of segment, type of vehicle, road type, transition probability, time of day, day of week. However, other embodiments may include additional or alternative dimensions, depending on available data. The input to the transformer network is a matrix of M*N. Since N can vary according to the specified route (i.e. each specified route could have a different number N of defined segments), commonly-used padding or pooling can be used to make sure that each route results in the same input dimensions to the transformer network.

It is known, from the above-referenced prior art, for example, to represent a road network as a node-based graph, wherein each node represents a traffic sensor (or other suitable (physical) data point, such as a crossroads, junction, roundabout, fork in the road, etc.), and the edges (together with their respective weights) are determined by the connectivity as well as Euclidian distances between sensors. APIs, such as OSRM, are available, which enable a node-based graph of this type (representing an entire road network of interest) to be converted into an edge-based graph, wherein each vertex corresponds to an edge representing a segment of the road network, and an edge is connected to an adjacent edge (or vertex), via a node, if it is possible to reach one respective road segment from the other.

When the traffic state prediction module 127 receives data representative of a specified route from the routing API, an edge-based graph representative thereof can be extracted and retrieved from a stored such representation of the entire road network. In a first step, the traffic state prediction module converts the edge-based graph into a diffusion graph. In a diffusion graph, the weight of each node is representative of a traffic volume on the associated edge(s) of the road network, and the weight of each edge connecting two nodes is representative of a transition probability, i.e. a probability that the traffic volume will move from one node (road segment) to another. This transition probability is, essentially, indicative of how traffic will diffuse between edges of the road network. For example, and referring to FIG. 2 of the drawings, consider a simple edge-based graph having four edges, namely I1, I2, I3 and I4. The transition probabilities for each edge-to-edge transition are based on the weights assigned in the edge-based graph extracted in the manner described above. Each transition probability can be calculated as follows:

$$P(I1 \rightarrow I2) = \frac{\#(\text{weight})(I1 \rightarrow I2)}{\#(I1 \rightarrow I2) + \#(I1 \rightarrow I3)} = \frac{3}{3+2} = 3/5 = 0.6$$

In other words, the probability of traffic volume on edge I1 moving to edge I2 is based on the edge weight #(I1→I2) but also takes into account edge weight #(I1→I3) because traffic volume on I1 could move to either I2 or I3.

Similarly, $$P(I1 \rightarrow I3) = \frac{\#(I1 \rightarrow I3)}{\#(I1 \rightarrow I3) + \#(I1 \rightarrow I2)} = \frac{2}{2+3} = 2/5 = 0.4$$

Figure 2:
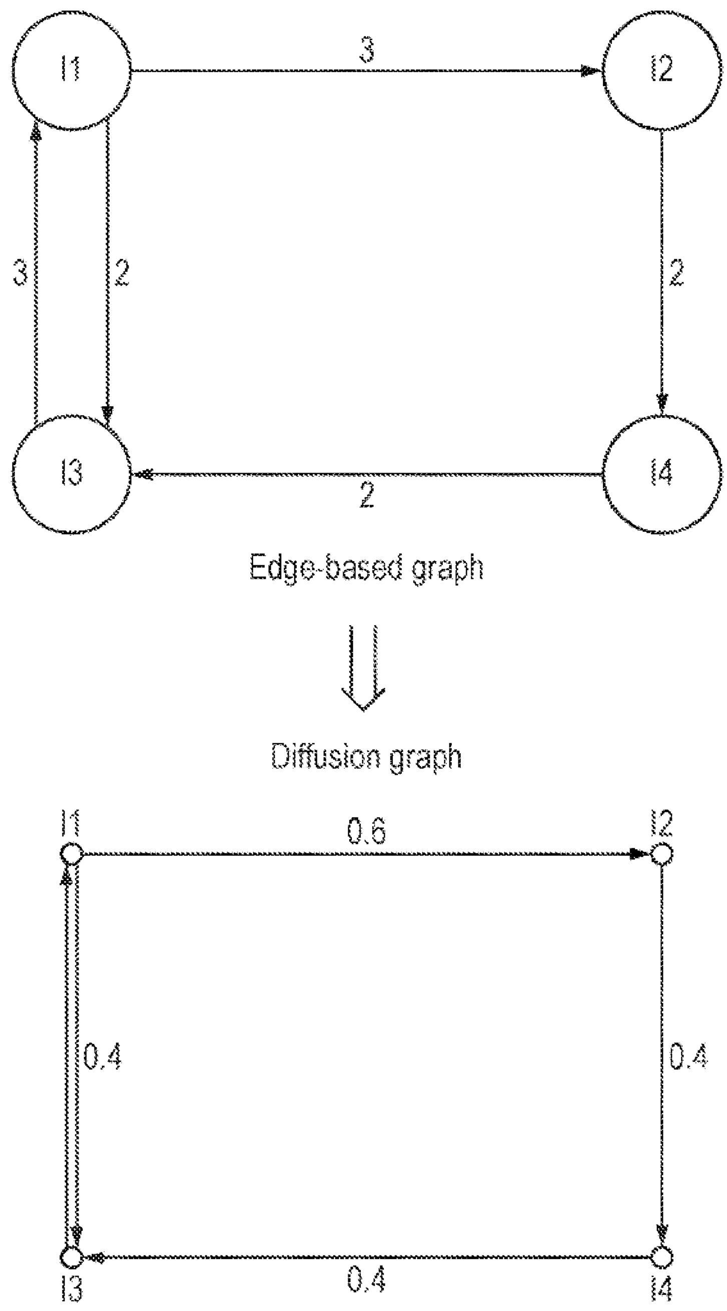
FIG. 2 is a schematic diagram illustrating the transformation of an edge-based graph into a diffusion graph for use in an exemplary communications server apparatus for allocating resources to service requests related to a shared economy on-demand transport and/or delivery service.

This can be repeated for each edge, in order to generate the diffusion graph illustrated on the lower part of FIG. 2, wherein the edge 'weights' are now transition probabilities that take into account the likelihood of traffic diffusion from each edge of the road network. In reality, this could be performed for a complete road network during the training phase, and a diffusion graph thus generated (for the whole road network for a particular geographical region) can be saved, possibly in a distributed manner (e.g. separated into smaller regions, and each region stored separately in the memory 130 of the communications server apparatus 102 or in the Cloud, for example). This avoids any potential memory issues caused by the storage of a single large file, and latency issues when it is required to extract a single, specified route: if the smaller region is specified, only the diffusion graph for that region needs to be accessed and used to extract (isolate) the specified route for predicting traffic states/conditions.

The transition probabilities for each edge (i.e. segment) of an extracted route can be utilized as a dimension of the input to a transformer-based prediction framework as referenced above, thereby contributing context-based traffic condition data to the sequential input data. In an embodiment, for each segment of the route, a transition probability is obtained from the diffusion graph, corresponding to the transition probability from that route segment to the next route segment in the route as specified by the diffusion graph (e.g. for a route segment corresponding to edge I2 in the FIG. 2 diffusion graph, the transition probability from I2 to I4 may be used as the input dimension of the transformer network). For the final route segment a default value (e.g. 0, 0.5 or 1) could be used. Alternatively, the transition probability from the preceding route segment into the current route segment could be used as the network input dimension for that segment (e.g. transition probability I1→I2 for edge I2), in which case a default value may be specified for the first route segment. Note that either approach can be adopted as long as it is applied consistently across training and prediction.

Another context-based variable relates to temporal dependency of traffic conditions on a specified route. For example, some roads may be exceptionally busy at peak times on weekdays, but much less so on weekend days. Thus, the prediction framework takes into account, not only a time of day but also a day of the week. This is achieved using two dimensions in the input, one for time of day and another for day of the week. In respect of the time of day dimension, the 24 hours making up a day can be partitioned into 48 slots, each 'slot' representing a 30-minute time period from midnight to midnight, and each slot is numbered sequentially from 0 to 47, such that a number selected from 0 to 47 can be used in the input sequence to represent a time of day. Thus, in an example, midnight could be represented by '0' and 2.20 am could be represented by '5', etc. In respect of the day of the week, numbers from 0 to 6 represent the days of the week (in sequence) from Sunday to Saturday. Thus, for example, '0' represents Sunday and '3' represents Wednesday, etc. Encoding techniques (such as a Fourier series expansion) could be used in transformer positional encoding to encode both day and week information in this manner.

Figure 3:
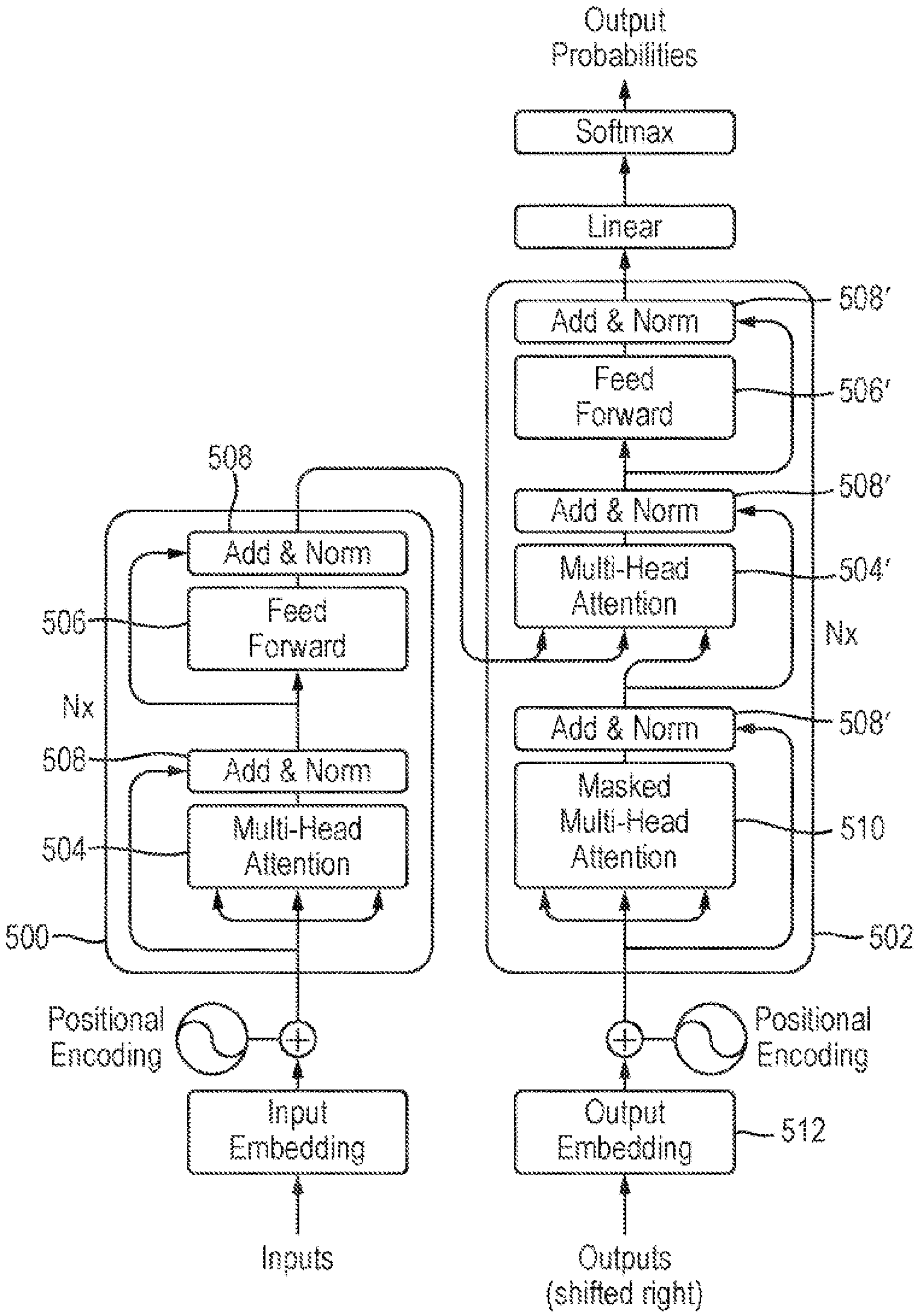
FIG. 3 is a schematic block diagram illustrating a Transformer-model architecture.

Referring to FIG. 3 of the drawings, a simplified and schematic block diagram representing a transformer-based architecture according to the prior art is illustrated. A typical transformer model comprises an encoder 500 and a decoder 502. The encoder 500 is composed of a stack of N identical layers and each layer has two sub-layers, namely a multi-head self-attention mechanism 504 and a position-wise fully connected feed forward network 506. There is a residual connection around each of the two sub-layers followed by a layer normalization (denoted generally at 508). The decoder 502 is also composed of a stack of N identical layers. In addition to the two sub-layers 504, 506 in each encoder layer, the decoder comprises a third sub-layer 510 that performs multi-head attention over the output of the encoder stack. Similar to the encoder, residual connections are employed around each of the sub-layers, followed by layer normalization (508'). The self-attention sub-layer is modified to prevent positions from attending to subsequent positions. This masking, combined with the fact that output embeddings 512 are offset by one position, ensures that the predictions for position i can depend only on the known outputs at positions less than i.

An attention function can be described as mapping a query (Q) and a set of Key-Value (K-V) pairs to an output, where the query, key-values and outputs are all vectors. The output is computed as a weighted sum of the values, where the weight assigned to each value is computed by a compatibility function of the query with the corresponding key.

The attention function is computed on a set of queries simultaneously, packed together in a matrix ($d_{model}$=N×M). The keys and values are also packed together into matrices K and V. The matrix of outputs is computed as:

$$\text{Attention}(Q, K, V) = \text{softmax}\left(\frac{QK^T}{\sqrt{d_k}}\right)V$$

where $d_k$ is the dimension of the keys.

Figure 3A:
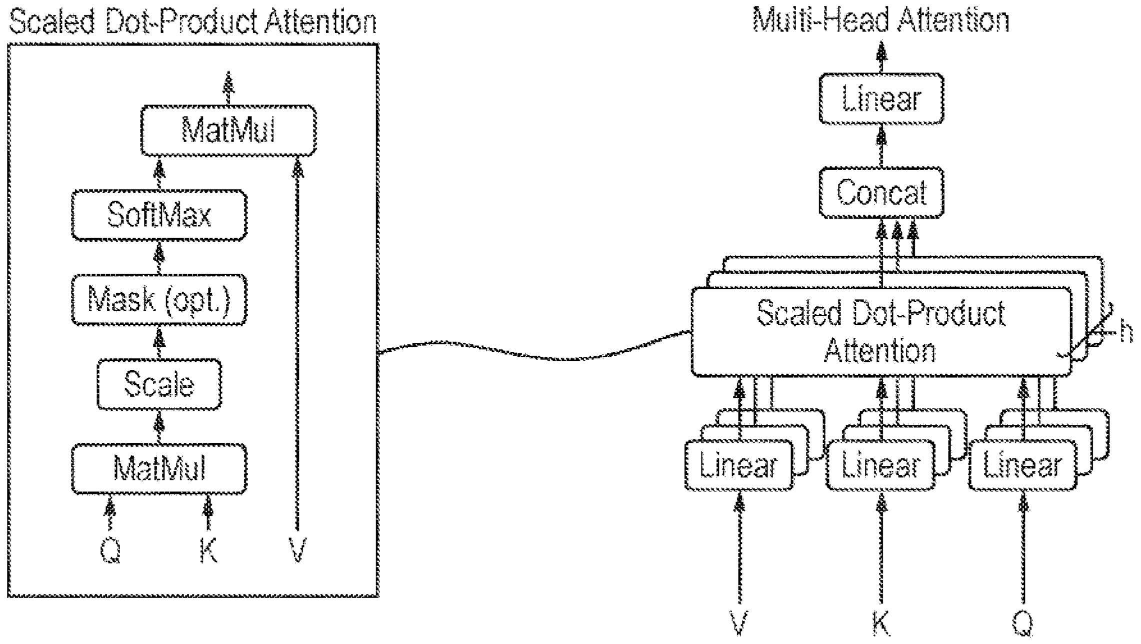
Fig. 3A Prior Art
FIG. 3A is a schematic diagram illustrating a multi-head attention function of a transformer-based prediction framework.

Instead of performing a single attention function with $d_{model}$-dimensional keys, values and queries, the queries (Q), keys (K) and values (V) are projected linearly h times with different, learned projections to $d_q$, $d_k$ and $d_v$ dimensions respectively. On each of these projected versions of queries, keys and values, the attention function is performed in parallel, yielding $d_v$-dimensional output values. These are then concatenated and once again projected, resulting in the final values, as shown in FIG. 3A. Multi-head attention allows the model to jointly attend to information from different representation sub-spaces at different positions. The dimension of each head can be reduced, as described above, to minimise total computational cost.

Figure 4:
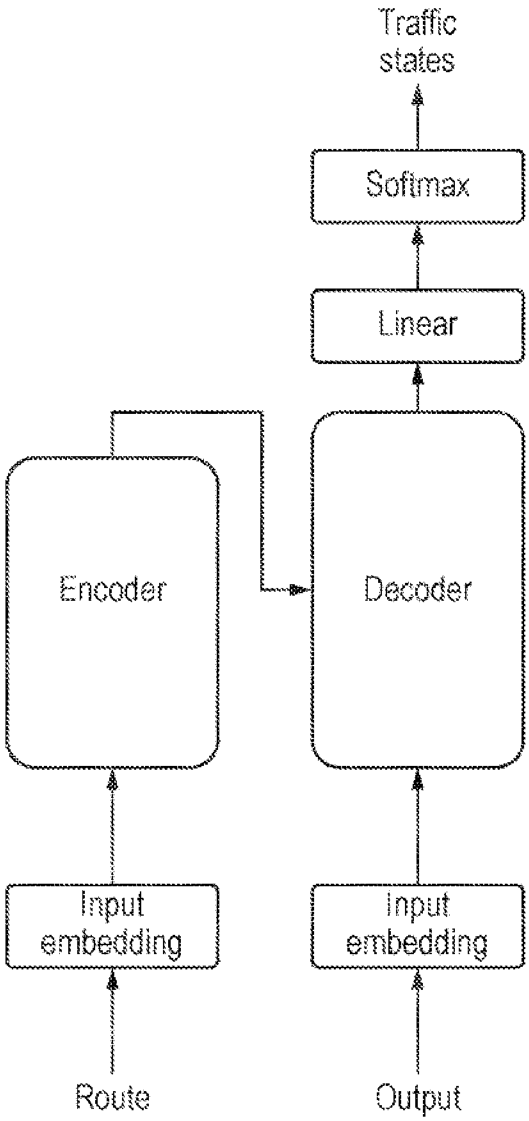
FIG. 4 is a schematic block diagram illustrating a Transformer-based framework for predicting traffic states in a communications server apparatus for allocating resources to service requests related to a shared economy on-demand transport and/or delivery service.

Thus, to summarise, in a conventional transformer model, a multi-head attention layer is used to perform self-attention. It operates, essentially, on a sequence of tokens $x=(x_1,$ $x_2, \ldots, x_n$), each of which is updated by using a weighted sum of any other 'word' (i.e. sequence of data items) after being passed through a linear transformation. The weights are attention scores, which are assigned according to the similarity between them. Referring to FIG. 4 of the drawings, there is illustrated a schematic (simplified) block diagram of a transformer-based framework for predicting traffic states (output) associated with a specified route (input). In this case, the above-mentioned 'similarity' between two edges includes their spatial and temporal similarity, as described in more detail below.

As previously described, in a conventional transformer network, the attention score computation is expressed as:

$$\text{Attention}(Q, K, V) = \text{softmax}\left(\frac{QK^T}{\sqrt{d_k}}\right)V$$

This can be written as:

$$Y_i = \sum_{j=1}^{n} a_{ij}(X_j W_{jv})$$

where:

$$a_{ij} = \frac{\exp(e_{ij})}{\sum_{k=1}^{n} \exp(e_{ik})}$$

and:

$$e_{ij} = \frac{(x_j W_Q)(x_j W_K)^T}{\sqrt{h}}$$

However, a network of this type only works effectively where there is a sequential dependency between the source and target sequences. Thus, in order to take into account non-sequential, context-based variables such as a specified route, vehicle type and transition probability (i.e. indication of how likely the current traffic state on the previous edge is to continue onto the next edge (of the specified route), the inventors have devised a unique method of adjusting the attention score in a transformer-based network, i.e.:

$$a'_{ij} = \frac{\exp(e'_{ij})}{\sum_{k=1}^{L} \exp(e'_{ik})} \quad \text{where} \quad e'_{ij} = b_{ij} e_{ij}$$

Thus, using this unique technique, a conventional transformer network (and its inherent technical advantages in terms of speed, accuracy and computational efficiency) can be used to perform predictions on data having non-sequential dependencies, by adjusting the attention score using a value $b_{ij}$.

Figure 5:
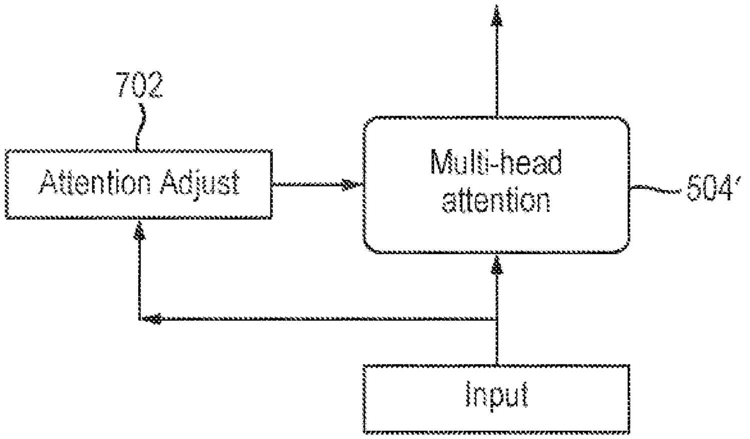
FIG. 5 is a schematic block diagram illustrating an attention head of the Transformer-based framework of FIG. 4.

$b_{ij}$ can be computed, within the transformer-based network, using an attention adjust layer 702 incorporated within the multi-head attention mechanism, as illustrated schematically in FIG. 5 of the drawings. It takes the original input and 'learns', during training, the probability of (i.e. how likely it is that) the traffic state on edge $I_i$ could influence that on edge $I_j$. This allows the network to learn $b_{ij}$ (the attention adjust weight) by taking road type, segment distance, transition probability, time, etc. into account.

A parameter $d_{ij}$ can be pre-computed according to a distance between edges $I_i$ and $I_j$:

$$d_{ij} = e^{-\alpha\, dist(I_i, I_j)}$$

where α is a decay parameter and α>0. The decay rate α is an empirical parameter that can, for example, be obtained by experiments on a test dataset, e.g. by varying a in steps of, say, 0.2. The larger α is, the higher is the decay rate. 'dist' takes into account road length (or route segment length) by computing the distance between $I_i$ and $I_j$. It will be apparent that $d_{ij}$ is a weight that tends towards the edges that are closer together.

For example, given the route I1→I2→I3→I4, the traffic state on edge I2 is more likely to influence that on I3 than that on I4 since the distance between I2 and I3 is less than the distance between I2 and I4.

Then, the softmax of $d_{ij}$ can be computed to obtain $b_{ij}$:

$$b_{ij} = \frac{\exp(d_{ij})}{\sum_{k=1}^{L} \exp(d_{ik})}$$

Thus, $b_{ij}$ acts to adjust the attention score $a_{ij}$ with a decay factor that describes how likely the current traffic state on an edge is to be influenced by that on the previous edge(s) of a specified route.

A transformer model of this type is trained using multiple training samples, which can be represented as key-value pairs. Thus, in an embodiment, each key is a set of dimensions comprising real-time speed, segment length, type of vehicle, road type, transition probability, time of day, and day of week, and each value is representative of a traffic condition associated with those dimensions. A typical system would be trained using hundreds or even thousands of such key-value pairs, extracted from massive traffic data obtained from traffic sensors, for example.

In an embodiment, the input data for training the transformer is derived from datasets of driver GPS positions and associated journey data associated with vehicles in a commercial ride hailing service (along with public mapping data e.g. as provided by geographic information services). However, any such large GPS dataset could be used in its place and the data could be obtained from multiple sources. For example, congestion information could be obtained from roadside traffic sensors.

To build the training data set, the following steps are performed:

Each individual driver trajectory derived from the GPS positions is first snapped to the routing graph (using standard map matching techniques).

The snapped routes are used to define the ground truth of the congestion that the transformer network aims to predict. By using the driver's path, the system identifies whether the duration over a road segment is longer than expected (given default speeds provided by public mapping data sources). This is converted to a class by defining static categories of delay (e.g. <1× the expected time, between 1-1.5× the expected time etc) as described in more detail below.

These routes are also used to compute the static transition probabilities (this is done on a holdout set).

These routes are then turned into training examples by computing the required features that are used at inference time for input to the transformer network (e.g. by deriving, for each route segment, dimensions such as speed, type of vehicle, time of day, and day of week from the ride hailing service journey records/GPS data, obtaining the transition probabilities as outlined above, and deriving features such as the segment length and road type from mapping data).

The resulting training samples are used to train the transformer network using conventional training techniques e.g. based on backpropagation and a loss function that quantifies a difference between the predicted traffic condition data output by the network for the route and the corresponding traffic condition data from the training sample (e.g. based a sum of squared errors across all route segments or some other evaluation method). Training may occur iteratively using different training and validation sets in order to tune hyperparameters and/or prevent overfitting using techniques know to those skilled in the art.

Figure 6:
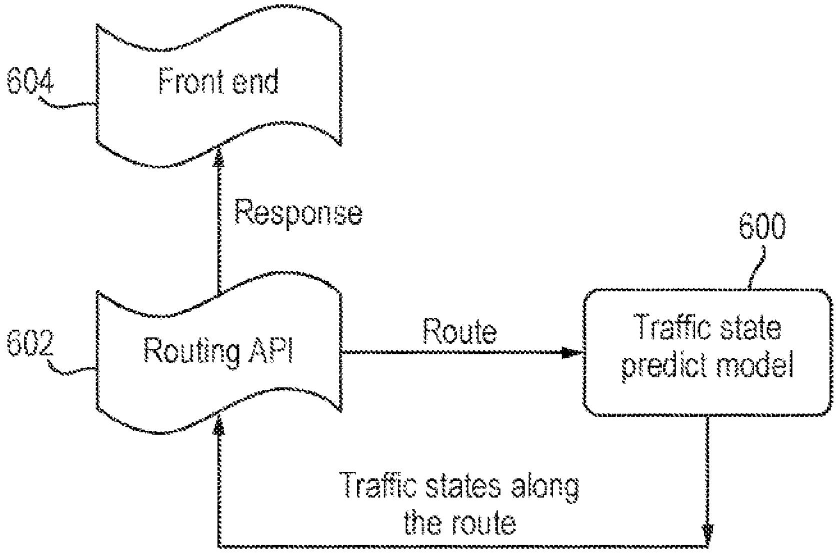
FIG. 6 is a schematic block diagram illustrating a routing API and traffic state prediction model of a communications server for allocating resources to service requests related to a shared economy on-demand transport and/or delivery service.
Figure 7:
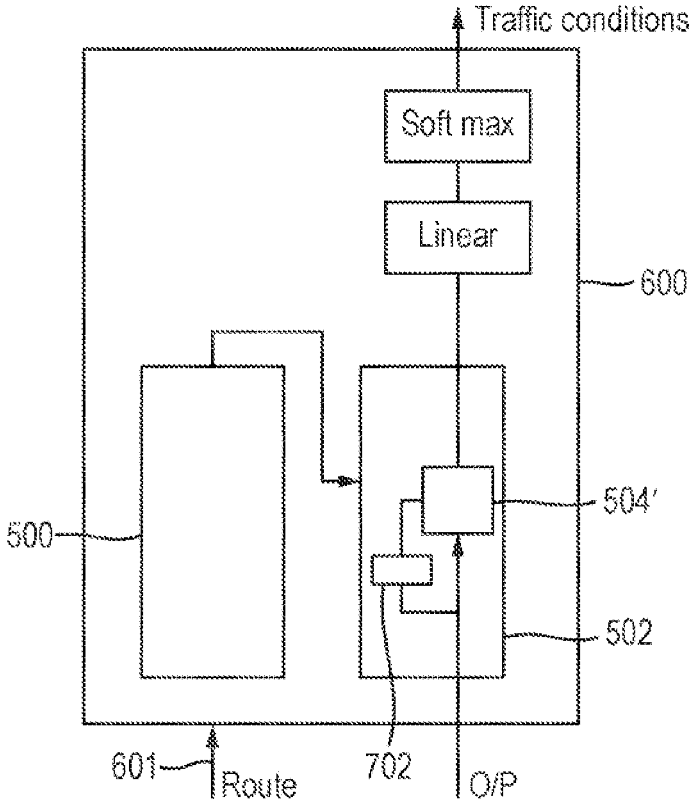
FIG. 7 is a schematic block diagram illustrating an exemplary communications system including a communications server apparatus for allocating resources to service requests related to a shared economy on-demand transport and/or delivery service.
Figure 8:
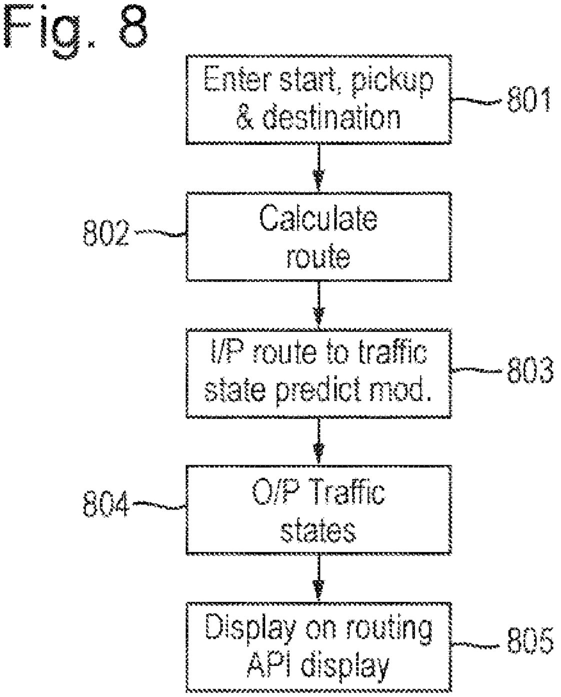
FIG. 8 is a schematic flow diagram illustrating a method of predicting traffic conditions along a specified route in a communications server for allocating resources to service requests related to a shared economy on-demand transport and/or delivery service.

Referring to FIGS. 6, 7 and 8 of the drawings, once trained, the traffic state prediction module 600 can be integrated with a conventional routing API 602. In a process for predicting traffic states along a route, the routing API 602 receives (at step 801) data from a service request comprising (at least) a starting point (i.e. where an allocated service provider is currently located, or will be located when the present service request is to be fulfilled), a pickup point and a destination. The routing API 602 determines (at step 802) a route and inputs (at step 803) the route 601 to the traffic state prediction module 600. The traffic state prediction module 600 generates (at step 804) a list of traffic states for each respective edge along the route. The traffic states, thus generated can then be displayed (step 805) on a user interface. In an embodiment, the traffic states associated with each edge (or segment) of the route could be colour coded, for example, to illustrate ‘light’, ‘moderate’, ‘heavy’ and ‘severe’ traffic conditions using, for example, colour coding: green, amber, red, dark red on those segments of the route displayed on the routing API user interface.

In an example, consider a route having starting point A, pickup point B and destination C. As a simplistic demonstration, consider route A→B→C as consisting of two compressed edges I1 and I2. Thus, there will be two sequential inputs, to the traffic state prediction module 600, based on the following data:

I1: speed: 20 m/s; length of road segment: 100 m; vehicle type: 4W, road type: primary, transition probability (calculated as explained above): 0.5; day of week: Sunday; time of day: midnight—00:29

I2: speed: 18 m/s; length of road segment: 150 m; vehicle type: 4W; road type: primary; transition probability: 0.3; day of week: Sunday; time of day: midnight—00:29.

The input data is, therefore:

I1: 20 m/s; 100 m; 4W; primary; 0.5, 0, 0

I2: 18 m/s; 150 m; 4W; primary; 0.3, 0, 0

The first two columns are normalized, as follows. The first column is normalized to 30 m/s, and the second column is normalized to 1000 m. A numerical label is assigned to the vehicle type. In this case, ‘1’ denotes 4W. Similarly, a numerical label is assigned to the road type. In this case, ‘2’ denotes a primary road. Thus, the sequential input data applied to the multi-head attention function of the transformer-based framework is:

0.67, 0.1, 1, 1, 0.5, 0, 0

0.6, 0.15, 1, 2, 0.3, 0, 0

The outputs from the multi-head attention function comprise two respective lists of traffic state predictions, one for each edge:

0.35, 0.2, 0.3, 0.15

0.5, 0.2, 0.2, 0.1

It will be apparent to a person skilled in the art that the above outputs from the multi-head attention function are initially the four probabilities of softmax (for each edge). The maximum value for each set of outputs can then be selected as the predicted traffic state for that edge.

An ideal travel time can be computed using a freeflow speed of a road (i.e. (road length)/(freeflow speed). The actual travel time is (road length)/(real-time speed). Using these values, a delay metric can be determined by comparing the ideal travel time with the actual travel time (known to persons skilled in the art as a travel time index). Predetermined thresholds could then be assigned (in relation to the travel time index, thus calculated) to denote the above-referenced elevated traffic states (moderate, heavy and severe). For example, ‘moderate’ can be defined as over 1.3, heavy as over 1.6 and severe as over 1.9. In the above example, the entire route would be displayed and highlighted in (say) green to show that the predicted traffic state is expected to be light. If a traffic state between 1.3 and 1.6 is predicted, the respective segment of the route might be highlighted in amber. If the predicted traffic state is between 1.6 and 1.9, the respective segment of the route might be highlighted in red. Finally, if the predicted traffic state is over 1.9, the respective segment of the route might be highlighted in dark red.

It will be noted that the above format of input and output values of the network (e.g. how data values are represented, normalized etc.) applies equally to the training phase, with the training samples represented in the same manner.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. A computer-implemented apparatus for predicting traffic conditions in respect of a specified route within a road network, the apparatus comprising a processor and a memory, and being configured, under control of the processor, to execute instructions stored in the memory to:

receive input data representative of said specified route comprising one or more road segments between a start location and a destination selected from within a road network representing a geographical region;

obtain a diffusion graph representative of said specified route, said diffusion graph comprising edges connected by nodes, wherein a weight associated with each edge comprises a respective transition probability computed as the ratio of an edge weight from a source road segment to a target road segment over a sum of all outgoing edge weights from the source road segment representing a likelihood of traffic on a respective road segment diffusing to another road segment; and use a Transformer-based framework to predict a traffic condition for each segment of the route;

wherein said Transformer-based framework comprises a multi-head attention mechanism and an input configured to receive a set of input dimensions for each segment of the route, said dimensions including at least a respective transition probability and temporal data, said Transformer-based framework further comprising an attention adjust layer incorporated within the multi-head attention mechanism configured to receive each set of input dimensions and generate therefrom a weight modifier for modifying attention weights generated by said multi-head attention mechanism based on the likelihood of a traffic state on one road segment influencing a traffic state on another road segment.

2. A computer-implemented apparatus according to claim 1, wherein each said set of input dimensions includes temporal data in the form of a day of the week and a time period represented by respective numerical values.

3. A computer-implemented apparatus according to claim 1, wherein each said set of input dimensions includes numerical data representative of a road type and/or a vehicle type in relation to travel along said specified route.

4. A computer-implemented apparatus according to claim 1, wherein each said set of input dimensions includes data representative of a speed of travel on a road segment and/or a length of a road segment.

5. A computer implemented apparatus according to claim 4, wherein said data representative of a speed of travel and/or said data representative of a length of a road segment is/are normalized in each said set of input dimensions.

6. A computer-implemented apparatus according to claim 1, configured to receive said specified route from a routing application programming interface (API).

7. A computer-implemented apparatus according to claim 1, further configured to calculate a travel time in respect of said specified route based on the predicted traffic conditions.

8. A computer-implemented apparatus according to claim 1, further configured to output the predicted traffic conditions in relation to said specified route on a display.

9. A computer-implemented apparatus according to claim 1, configured to obtain an edge-based graph representative of said specified route in which each vertex represents a segment of the road network, and a vertex is connected to an adjacent vertex when it is possible to reach one respective road segment from the other, and to determine the diffusion graph using the edge-based graph.

10. A computer-implemented apparatus according to claim 9, configured to determine respective transition probabilities in the diffusion graph based on corresponding weights in the edge-base graph.

11. A computer-implemented apparatus according to claim 1, wherein the attention adjust module is configured to generate the weight modifier for modifying attention weights based on distances between road segments.

12. A communications apparatus for allocating resources to service requests related to a shared economy on-demand travel and/or transport service provision, the communications apparatus comprising a processor, a memory and a computer-implemented apparatus according to claim 1 for predicting traffic conditions, and being configured, under control of the processor, to:

receive a service request;

identify a start location and a destination specified in said service request; obtain a recommended route comprising one or more road segments between said start location and said destination selected from within a road network representing a geographical region;

identify a service provider for fulfilling said service request; and input said recommended route and data representative of said service provider to said apparatus for predicting traffic conditions to generate a set of predicted traffic condition data associated with said one or more road segments in said recommended route.

13. A communications apparatus according to claim 12, configured to output said predicted traffic condition data in association with said recommended route on a user display.

14. A communications apparatus according to claim 12, further configured to predict an arrival time of said service provider at said destination using the predicted traffic condition data.

15. A communications apparatus according to claim 14, further configured to allocate another service request to said service provider based on said predicted arrival time at said destination of the previous service request.

16. A communications apparatus according to claim 12, comprising a data store in which is stored edge-based graph data for said road network, and wherein said apparatus for predicting traffic conditions is further configured to selectively retrieve said edge-based graph data representative of a recommended route from said data store.

17. A communications apparatus according to claim 16, wherein said data store is a distributed data store comprising a plurality of memory locations, each memory location storing edge-based graph data for a different respective portion of said road network.

18. A communications system for allocating resources to service requests related to a shared economy on-demand transport and/or delivery service provision, the communications system comprising at least one user communications device and communications network equipment operable for the communications server apparatus and the at least one user communications device to establish communication with each other therethrough, and at least one service provider communications device and communications network equipment operable for the communications server apparatus and the at least one service provider communications device to establish communication with each other therethrough, the communications server apparatus comprising a processor, a memory and a computer-implemented apparatus according to claim 1, and being configured, under the control of the processor, to execute instructions stored in the memory to:

receive a service request from the user communications device;

input a start location and a destination specified in said service request to a routing API to obtain a recommended route comprising one or more road segments between said start location and said destination selected from within a road network representing a geographical region;

identify a service provider for fulfilling said service request; and input said recommended route and data representative of said service provider to said apparatus for predicting traffic conditions to generate a set of predicted traffic condition data associated with said one or more road segments in said recommended route.

19. A service provider communications device for receiving data representative of service requests allocated to a service provider from a communications server apparatus via a communications network, the service provider communications device comprising a routing API, and a computer-implemented apparatus according to claim 1, a processor and a memory, and being configured, under control of the processor, to execute instructions stored in the memory to:

receive data representative of a service request including a start location and a destination;

input said start location and destination specified in said service request to said routing API to obtain a recommended route comprising one or more road segments between said start location and said destination selected from within a road network representing a geographical region; and input said recommended route and data representative of said service provider to said apparatus for predicting traffic conditions to generate a set of predicted traffic condition data associated with said one or more road segments in said recommended route.

20. A computer-implemented method of predicting traffic conditions in respect of a specified route within a road network, comprising the steps of:

receiving input data representative of said specified route comprising one or more road segments between a start location and a destination selected from within a road network representing a geographical region;

obtaining a diffusion graph representative of said specified route, said diffusion graph comprising edges connected by nodes, wherein a weight associated with each edge comprises a respective transition probability representing a likelihood of traffic on a respective road segment diffusing to another road segment; and using a Transformer-based framework to predict a traffic condition for each segment of the route;

wherein said Transformer-based framework comprises a multi-head attention mechanism and an input configured to receive a set of input dimensions for each segment of the route, said dimensions including at least a respective transition probability and temporal data, said Transformer-based framework further comprising an attention adjust layer incorporated within the multi-head attention mechanism configured to receive each set of input dimensions and generate therefrom a weight modifier for modifying attention weights generated by said multi-head attention mechanism based on the likelihood of a traffic state on one road segment influencing a traffic state on another road segment.

21. A non-transitory computer-readable medium comprising instructions for implementing the method of claim 20.

22. A non-transitory storage medium storing instructions which, when executed by a processor, cause the processor to perform the method of claim 20.

* * * * *